(12) United States Patent
Kim

(10) Patent No.: US 9,612,676 B2
(45) Date of Patent: Apr. 4, 2017

(54) METHOD FOR IMPROVING TOUCH RESPONSE AND AN ELECTRONIC DEVICE THEREOF

(71) Applicant: Samsung Electronics Co., Ltd., Suwon-si, Gyeonggi-do (KR)

(72) Inventor: Sang-Heon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 624 days.

(21) Appl. No.: 13/872,372

(22) Filed: Apr. 29, 2013

(65) Prior Publication Data
US 2013/0285960 A1    Oct. 31, 2013

(30) Foreign Application Priority Data
Apr. 27, 2012 (KR) ........................ 10-2012-0044510

(51) Int. Cl.
G06F 3/041 (2006.01)
G06F 3/0488 (2013.01)

(52) U.S. Cl.
CPC .......... G06F 3/0416 (2013.01); G06F 3/0488 (2013.01)

(58) Field of Classification Search
CPC ............................ G06F 3/0416; G06F 3/0488
USPC ..................... 345/173–174; 178/18.01–18.09
See application file for complete search history.

(56) References Cited

U.S. PATENT DOCUMENTS

| | | | |
|---|---|---|---|
| 6,580,442 B1* | 6/2003 | Singh et al. .................. 715/840 |
| 7,821,506 B2* | 10/2010 | Sato .................... G06F 3/03547 178/18.01 |
| 8,237,552 B2* | 8/2012 | Kim ................... H04N 1/00307 340/407.1 |
| 8,537,139 B2* | 9/2013 | Chen ....................... G06F 3/042 345/1.3 |
| 8,797,281 B2* | 8/2014 | Simmons .............. G06F 3/0416 345/173 |
| 8,896,546 B2* | 11/2014 | Grothe ......................... 345/156 |
| 9,007,314 B2* | 4/2015 | Liu ........................ G06F 3/041 178/18.03 |
| 2005/0210472 A1* | 9/2005 | Accapadi ................ G06F 9/505 718/105 |
| 2005/0210742 A1* | 9/2005 | Carr et al. ..................... 47/57.6 |
| 2008/0168404 A1 | 7/2008 | Ording |
| 2008/0176604 A1* | 7/2008 | Kim .................... G06F 3/04886 455/566 |
| 2008/0198141 A1 | 8/2008 | Lee et al. |
| 2009/0153438 A1* | 6/2009 | Miller .................. G06F 3/0488 345/55 |
| 2010/0064245 A1* | 3/2010 | Smith et al. .................. 715/778 |
| 2010/0122205 A1 | 5/2010 | Jarrett et al. |

(Continued)

FOREIGN PATENT DOCUMENTS

KR    10-2008-0034245 A    4/2008
WO    2009/149976 A2    12/2009

Primary Examiner — Rodney Amadiz
(74) Attorney, Agent, or Firm — Jefferson IP Law, LLP

(57) ABSTRACT

A method and an apparatus for processing touch information in an electronic device are provided. The method for processing touch information includes determining one or more regions for performing a touch event corresponding to touch information in the electronic device displayed on a touch screen, and when detecting a first touch, determining whether to process an event of the first touch in an electronic document by considering a first touch point and the one or more regions.

17 Claims, 9 Drawing Sheets

(56) References Cited

U.S. PATENT DOCUMENTS

| | | | |
|---|---|---|---|
| 2010/0156835 A1* | 6/2010 | Tamura | G06F 3/0416 345/173 |
| 2010/0273533 A1 | 10/2010 | Cho | |
| 2011/0069015 A1* | 3/2011 | Nurmi | G06F 3/041 345/173 |
| 2011/0119454 A1* | 5/2011 | Kung | G06F 3/14 711/150 |
| 2011/0179388 A1 | 7/2011 | Fleizach et al. | |
| 2011/0181523 A1* | 7/2011 | Grothe | G06F 3/0418 345/173 |
| 2011/0202835 A1 | 8/2011 | Jakobsson et al. | |
| 2011/0231756 A1 | 9/2011 | Nolhage | |
| 2011/0298744 A1* | 12/2011 | Souchkov | G06F 3/044 345/174 |
| 2011/0310025 A1* | 12/2011 | Simmons | G06F 3/0416 345/173 |
| 2012/0256852 A1* | 10/2012 | Van Antwerpen | G06F 3/0416 345/173 |
| 2012/0262392 A1* | 10/2012 | Lin | G06F 1/1616 345/173 |
| 2012/0287083 A1* | 11/2012 | Chen | G06F 3/042 345/175 |
| 2012/0306779 A1* | 12/2012 | Weeldreyer | G06F 3/0488 345/173 |
| 2013/0082947 A1* | 4/2013 | Chang | G06F 1/1643 345/173 |
| 2013/0201118 A1* | 8/2013 | Liu | G06F 3/0416 345/173 |
| 2013/0285960 A1* | 10/2013 | Kim | G06F 3/0416 345/173 |

\* cited by examiner

METHOD FOR IMPROVING TOUCH RESPONSE AND AN ELECTRONIC DEVICE THEREOF

PRIORITY

The present application claims the benefit under 35 U.S.C. §119(a) of a Korean patent application filed on Apr. 27, 2012 in the Korean Intellectual Property Office, and assigned Serial No. 10-2012-0044510, the entire disclosure of which is hereby incorporated by reference.

BACKGROUND OF THE INVENTION

1. Field of the Invention

The present invention relates to an electronic device. More particularly, the present invention relates to an electronic device including a touch screen.

2. Description of the Related Art

As multimedia services are increasingly used in a portable electronic device, demand for information to be processed and displayed by the portable electronic device also increases. Hence, a portable electronic device including a touch screen capable of expanding a display size by improving space occupancy draws more attention.

The electronic device conducts an operation corresponding to touch information detected through the touch screen. When using a structured electronic document such as webpage, the electronic device may control to conduct a touch event corresponding to the touch information in the electronic document. For example, the electronic device can control to execute the touch event corresponding to the touch information only in some contents of the electronic document. Accordingly, a touch processor of the electronic device determines using an electronic document processor whether the touch information is a touch event of an application program or a touch event of the electronic document.

As discussed above, when using the electronic document, the electronic device needs to determine whether the touch information detected through the touch screen corresponds to the touch event of the electronic document. Disadvantageously, when the electronic device determines whether to conduct the touch event of the electronic document after the touch information is detected, a delay is caused until the touch event corresponding to the touch information is performed.

Therefore, a need exists for an apparatus and a method for improving touch response in an electronic device including a touch screen.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention to provide an apparatus and a method for improving touch response in an electronic device including a touch screen.

Another aspect of the present invention is to provide an apparatus and a method for improving touch response for a structured electronic document in an electronic device including a touch screen.

Another aspect of the present invention is to provide an apparatus and a method for determining only whether a touch event occurs in contents at a touch point in an electronic device which uses a structured electronic document.

Another aspect of the present invention is to provide an apparatus and a method for determining only whether a touch event occurs in a touch detection region of an electronic document in an electronic device which uses a structured electronic document.

Another aspect of the present invention is to provide an apparatus and a method for determining only whether a touch event occurs in a touch detection region of an electronic document using touch detection region information of a tree structure in an electronic device which uses a structured electronic document.

Another aspect of the present invention is to provide an apparatus and a method for performing an operation corresponding to touch information in an electronic document application program while determining whether a touch event occurs in a touch detection region of the electronic document in an electronic device which uses a structured electronic document.

According to an aspect of the present invention, a method for processing touch information in an electronic device is provided. The method includes determining one or more regions for performing a touch event corresponding to touch information in the electronic device displayed on a touch screen, and when detecting a first touch, determining whether to process an event of the first touch in an electronic document by considering a first touch point and the one or more regions.

According to another aspect of the present invention, an electronic device is provided. The electronic device includes a touch screen, and a first processor for determining one or more regions for performing a touch event corresponding to touch information in an electronic device displayed on the touch screen, and when detecting a first touch on the touch screen, determining whether to process an event of the first touch in an electronic document by considering a first touch point and the one or more regions.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
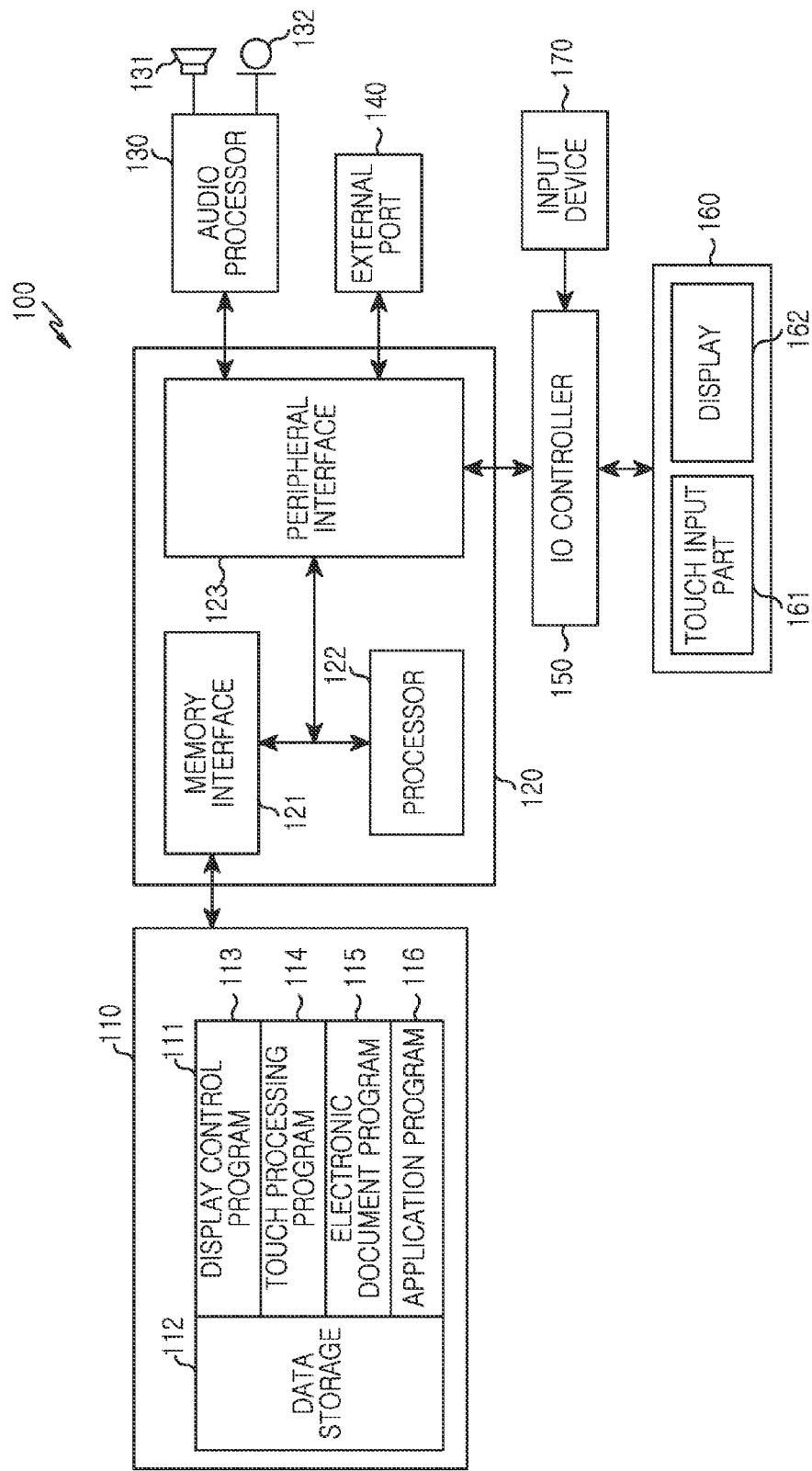
FIG. 1 is a block diagram of an electronic device including a touch screen according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for improving touch response in an electronic device including a touch screen.

The electronic device can employ devices including a touch screen, such as a portable electronic device, a portable terminal, a mobile terminal, a mobile pad, a media player, a Personal Digital Assistant (PDA), a laptop computer, a smart phone, a netbook, a Television (TV), a Mobile Internet Device (MID), a Ultra Mobile Personal Computer (UMPC), a tablet PC, a desktop computer, a smart TV, a digital camera, a wrist watch, a navigation system, and an MP3 player. The electronic device may be an electronic device combining two or more functions of the above-identified devices.

Hereinafter, a touch event of an electronic document application program indicates an operation corresponding to touch information detected through a touch input part in the electronic document application program. For example, when scrolling is detected through the touch input part, the electronic device scrolls through the electronic document application program displayed on a display and thus switches the whole electronic document displayed on the display.

The touch event of the electronic document indicates a series of operations corresponding to the touch information detected through the touch input part in a particular content of the structured electronic document. For example, when scrolling is detected through the touch input part, the electronic device scrolls through the particular content of the electronic document displayed on the display.

FIG. 1 is a block diagram of an electronic device including a touch screen according to an exemplary embodiment of the present invention.

Referring to FIG. 1, the electronic device 100 includes a memory 110, a processor unit 120, an audio processor 130, an external port 140, an Input Output (IO) controller 150, a touch screen 160, and an input device 170. According to exemplary embodiments of the present invention, a plurality of memories 110 and a plurality of external ports 140 may be provided.

The memory 110 includes a program storage 111 for storing a program to control operations of the electronic device 100 and a data storage 112 for storing data generated in program execution.

The data storage 112 stores touch detection region information of the electronic document displayed on a display 162. In so doing, the data storage 112 generates and stores only touch detection region information which requires a touch event of the electronic document. The data storage 112 may store the touch detection region information which requires a touch event of the electronic document in a tree structure. The touch detection region indicates a content region allowing the touch event of the electronic document in the structured electronic document.

The program storage 111 includes a display control program 113, a touch processing program 114, an electronic document program 115, and at least one application program 116. The program in the program storage 111 may be referred to as an instruction set which is a set of instructions.

The electronic document program 115 includes at least one software component for controlling to display the electronic document in the display 162. The electronic document program 115 includes an instruction for extracting the touch detection region information from the electronic document displayed in the display 162 and for storing the extracted touch detection region information in the data storage 112.

The electronic document program 115 includes an instruction for determining whether to process the touch information in the electronic document.

The display control program 113 includes at least one software component for providing and displaying graphics on the display 162. For example, the display control program 113 includes an instruction for displaying the electronic document in the display 162 in association with the electronic document program 115. For example, the display control program 113 includes an instruction for displaying the touch event corresponding to the touch information detected through a touch input part 161. In so doing, the display control program 113 displays the touch event of the electronic document application program corresponding to the touch information, or the touch event of the electronic document.

The touch processing program 114 includes at least one software component for determining whether the touch information provided from the touch input part 161 is the touch event of the electronic document application program or the touch event of the electronic document. In so doing, the touch processing program 114 can determine whether the touch information provided from the touch input part 161 corresponds to the touch event of the electronic document application program or the touch event of the electronic document by taking into account the touch detection region information stored in the data storage 112.

For example, when the touch information provided from the touch input part 161 corresponds to the touch event of the electronic document application program, the touch processing program 114 can control to process the touch information through the display control program 113. For example, when the touch information provided from the touch input part 161 corresponds to the touch event of the electronic document, the touch processing program 114 can control to determine whether the electronic document program 115 can process the touch information. In so doing, the touch processing program 114 may control to process the touch information provided from the touch input part 161 through the display control program 113. For example, when the electronic document program 115 processes the touch information, the touch processing program 114 can control the electronic document program 115 to process the touch information. In contrast, when the electronic document program 115 cannot process the touch information, the touch processing program 114 can control the display control program 113 to process the touch information.

The application program 116 includes a software component for at least one application program installed in the electronic device 100.

The processor unit 120 may include a memory interface 121, at least one processor 122, and a peripheral interface 123. The memory interface 121, the at least one processor 122, and the peripheral interface 123 of the processor unit 120 may be integrated onto at least one integrated circuit or may embodied separately.

The memory interface 121 controls the access of the component such as processor 122 or peripheral interface 123, to the memory 110.

The peripheral interface 123 controls connections between an IO peripheral of the electronic device 100, and the processor 122 and the memory interface 121.

The processor 122 controls the electronic device 100 to provide various multimedia services using at least one software program. In so doing, the processor 122 executes the at least one software program stored in the memory 110 and thus controls to provide the service corresponding to the software program.

The audio processor 130 provides an audio interface between the user and the electronic device 100 through a speaker 131 and a microphone 132.

The external port 140 includes a connection interface for connecting the electronic device 100 with other electronic device directly or over a network. For example, the external port 140 can include, but is not limited to, a Universal Serial Bus (USB) port and a High Definition Multimedia Interface (HDMI) port.

The IO controller 150 provides an interface between the IO device such as touch screen 160 and input device 170, and the peripheral interface 123.

The touch screen 160, which is an IO device for outputting and inputting information, includes the touch input part 161 and the display 162.

The touch input part 161 provides the touch information detected through a touch panel, to the processor unit 120 via the IO controller 150. In so doing, the touch input part 161 changes the touch information to an instruction such as touch_down, touch_move, touch_up, and the like, and provides the instruction to the processor unit 120.

The display 162 displays status information of the electronic device 100, a character input by the user, a moving picture, and a still picture. For example, the display 162 displays the electronic document according to the display control program 113. Also, the display 162 displays the touch event of the electronic document application program or the touch event of the electronic document according to the touch information under control of the display control program 113.

The input device 170 provides input data generated by a user's selection to the processor unit 120 through the IO controller 150. For example, the input device 170 includes only a control button to control the electronic device 100. For example, the input device 170 may include a keypad for receiving the input data from the user.

The electronic device 100 may further include a communication system (not shown) for voice communication and data communication. The communication system may include a plurality of communication submodules for supporting different communication networks. For example, the communication network includes, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, Near Field Communication (NFC), and the like.

Figure 2:
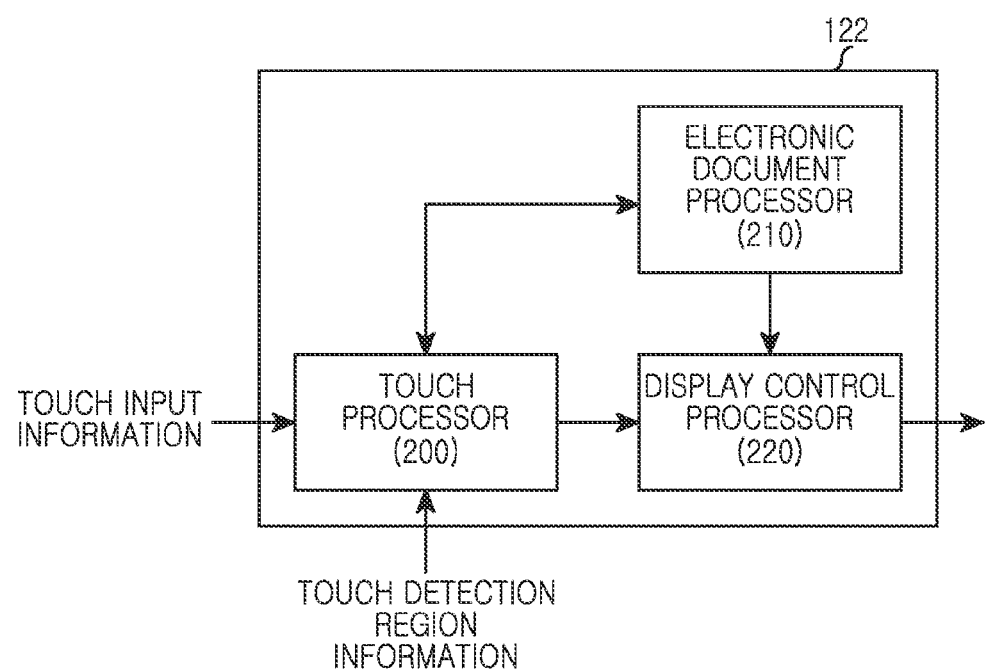
FIG. 2 is a detailed block diagram of a processor according to an exemplary embodiment of the present invention.

FIG. 2 is a detailed block diagram of a processor according to an exemplary embodiment of the present invention.

Referring to FIG. 2, the processor 122 includes a touch processor 200, an electronic document processor 210, and a display control processor 220.

Figure 5:
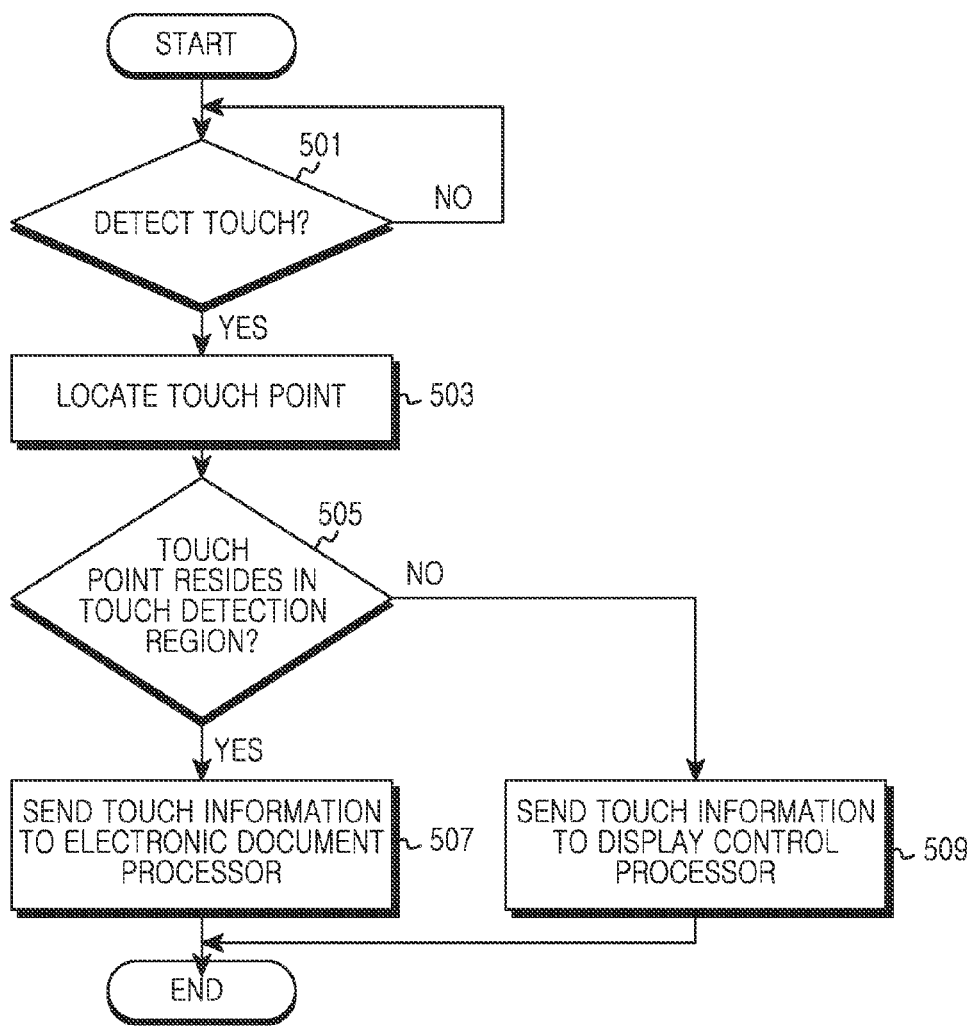
FIG. 5 is a flowchart of a method for sending touch information by considering touch detection region information of an electronic document according to an exemplary embodiment of the present invention.
Figure 7:
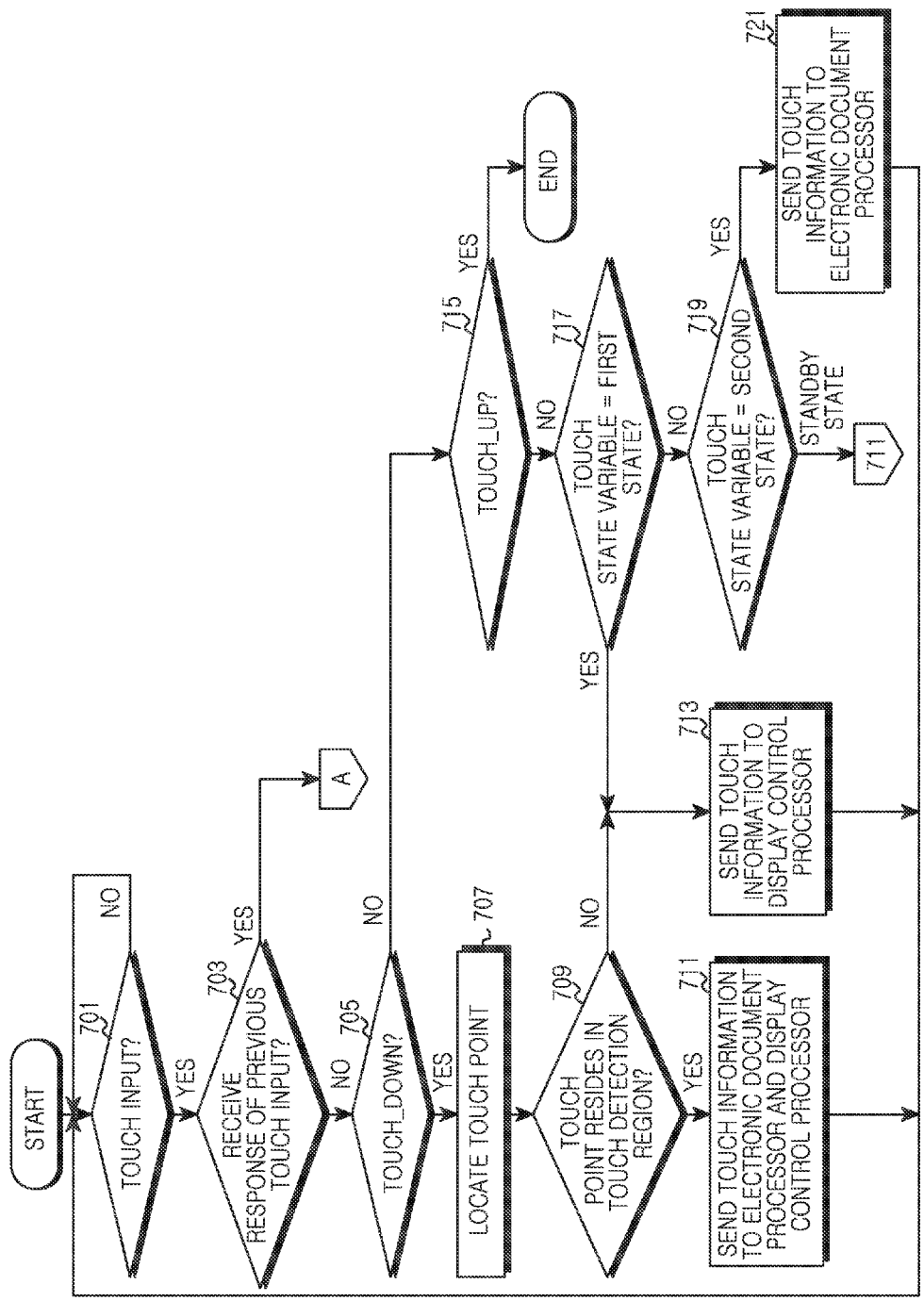
FIG. 7 is a flowchart of operations of a touch processor according to an exemplary embodiment of the present invention.
Figure 8:
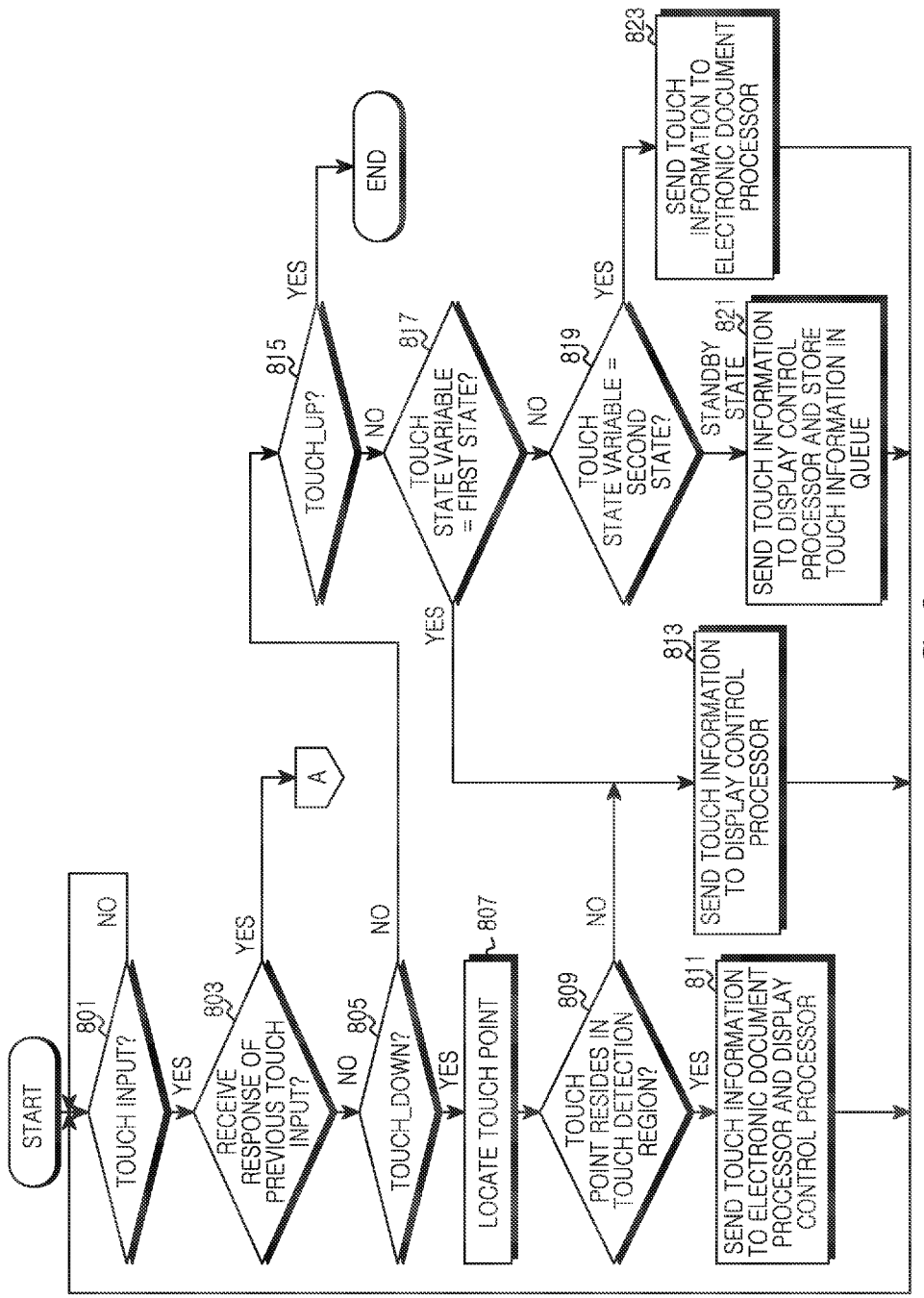
FIG. 8 is a flowchart of operations of a touch processor according to an exemplary embodiment of the present invention.

The touch processor 200 executes the touch processing program 114 of the program storage 111 and thus determines whether the touch information provided from the touch input part 161 corresponds to the touch event of the electronic document application program or the touch event of the electronic document. In so doing, the touch processor 200 can determine whether the touch information provided from the touch input part 161 corresponds to the touch event of the electronic document application program or the touch event of the electronic document by taking into account the touch point as shown in FIGS. 5, 7, and 8 and the touch detection region information stored in the data storage 112.

When the touch information received from the touch input part 161 corresponds to the touch event of the electronic document application program, the touch processor 200 sends the touch information to the display control processor 220. In contrast, when the touch information provided from the touch input part 161 corresponds to the touch event of the electronic document, the touch processor 200 sends the touch information to the electronic document processor 210 in order to determine whether the electronic document can process the touch information. In so doing, the touch processor 200 may send the touch information to the display control processor 220 as well.

When the electronic document processor 210 can process the touch event of the touch information, the touch processor 200 sends the touch information detected by the touch input part 161 to the electronic document processor 210. In contrast, when the electronic document processor 210 cannot process the touch event of the touch information, the touch processor 200 sends the touch information detected by the touch input part 161 to the display control processor 220.

Figure 3:
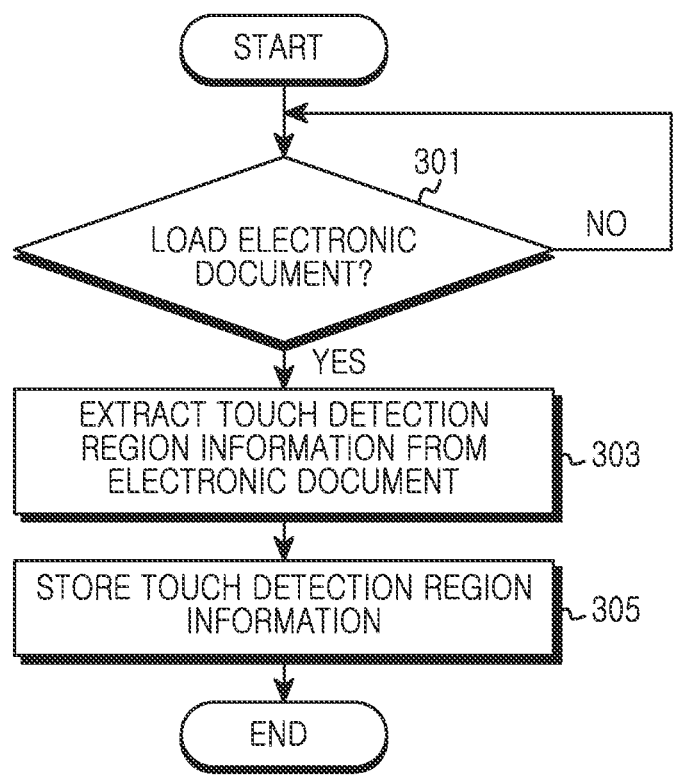
FIG. 3 is a flowchart of a method for loading an electronic document according to an exemplary embodiment of the present invention.

The electronic document processor 210 runs the electronic document program 115 of the program storage 111 and thus controls to generate the electronic document to be displayed in the display 162. In so doing, the electronic document processor 210 can control to extract the touch detection region information of the electronic document displayed in the display 162 and to store the extracted touch detection region information in the data storage 112 as shown in FIG. 3. For example, the electronic document processor 210 can control to extract a content region (e.g., the touch detection region) for the touch event from electronic document constitution information and to store the extracted content region in the data storage 112.

The electronic document processor 210 determines whether to process the touch information received from the touch processor 200 in the electronic document. For example, the electronic document processor 210 can determine whether to process the touch information received from the touch processor 200 in the electronic document by considering the processable touch event information of the electronic document constitution information.

When the electronic document itself can process the touch information received from the touch processor 200, the electronic document processor 210 can send touch event information corresponding to the touch information of the content of the electronic document, to the display control processor 220.

The display control processor 220 runs the display control program 113 of the program storage 111 and thus controls to display the graphics on the display 162. For example, the display control processor 220 controls to display the electronic document in the display 162 by taking into account the electronic document information received from the electronic document processor 210. For example, the display control processor 220 controls to display the touch event of the electronic document application program corresponding to the touch information received from the touch processor 200. Also, the display control processor 220 controls to display the touch event of the content of the electronic document corresponding to the touch information received from the electronic document processor 210.

According to exemplary embodiments of the present invention, the electronic device 100 controls to display the electronic document and to conduct the touch event by running the display control program 113, the touch processing program 114, and the electronic document program 115 stored in the program storage 111 through the touch processor 200, the electronic document processor 210, and the display control processor 220.

Alternatively, the electronic device 100 may control to display the electronic document and to execute the touch event using the single processor 122 which runs the display control program 113, the touch processing program 114, and the electronic document program 115.

Figure 4:
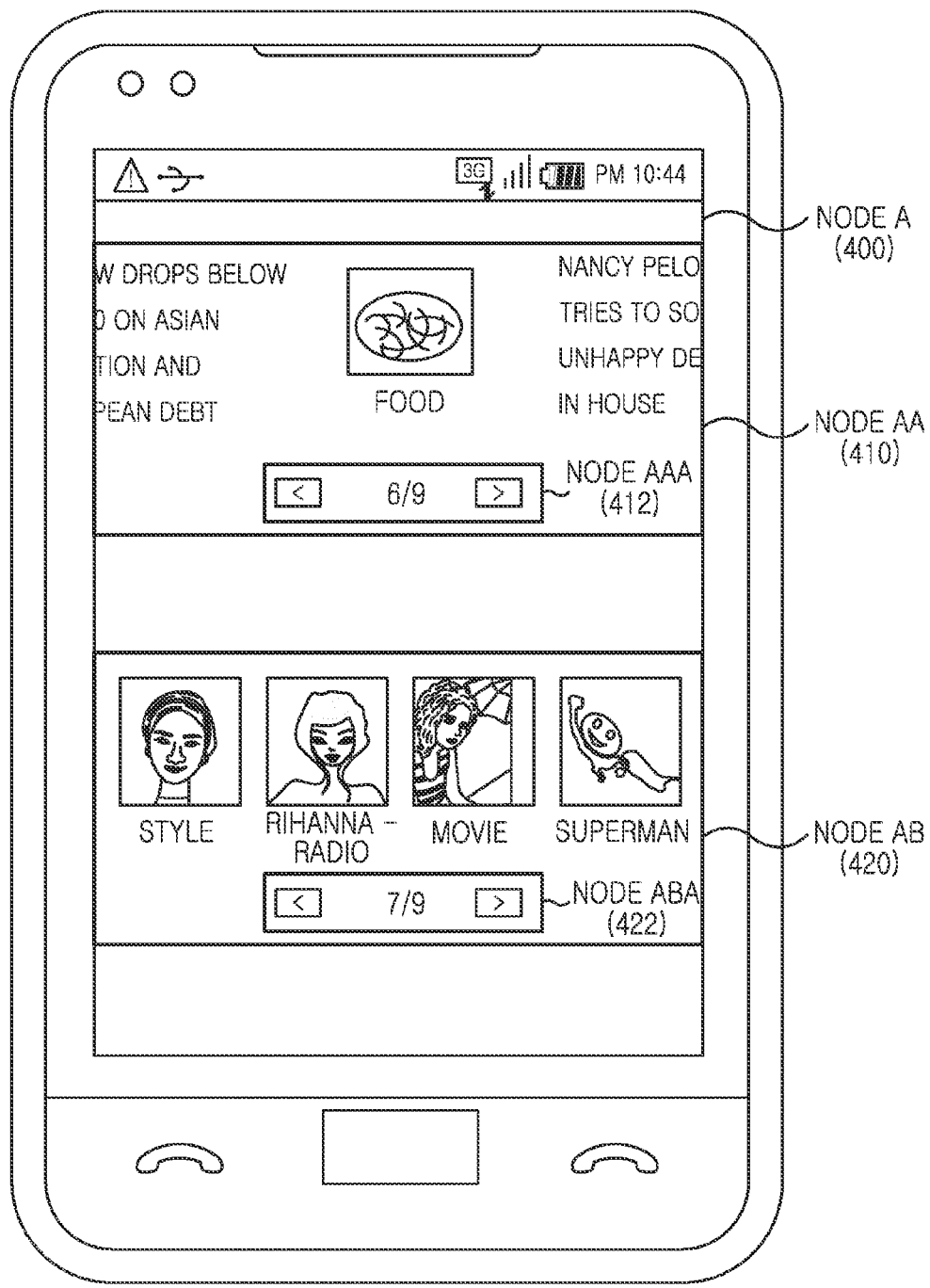
FIG. 4 is a diagram of an electronic document according to an exemplary embodiment of the present invention.

FIG. 3 is a flowchart of a method for loading an electronic document according to an exemplary embodiment of the present invention. FIG. 4 is a diagram of an electronic document according to an exemplary embodiment of the present invention.

Referring to FIGS. 3 and 4, the electronic device determines whether to load the electronic document in step 301. For example, the electronic device determines whether a user's manipulation executes the electronic document application program. When the electronic document application program is executed, the electronic device recognizes that the electronic document for the electronic document application program is loaded.

When loading the electronic document, the electronic device extracts the touch detection region from the electronic document constitution information in step 303. For example, when the electronic document is loaded as shown in FIG. 4, the electronic device extracts content regions 410, 412, 420 and 422 available for the touch event in the electronic document 400 by considering the electronic document constitution information.

In step 305, the electronic device stores the touch detection region information. For example, the electronic device can store the touch detection regions of FIG. 4 in the tree structure of Table 1.

TABLE 1

| | Node A | |
|---|---|---|
| Mother node | | |
| The first child node | Node AA | Node AB |
| The second child node | Node AAA | Node ABA |

As stated above, the electronic device can extract and store the touch detection region information of the structured electronic document. Hence, the electronic device can easily detect the touch event of the electronic document for the touch information by considering the touch detection region information as shown in FIG. 5.

Figure 6:
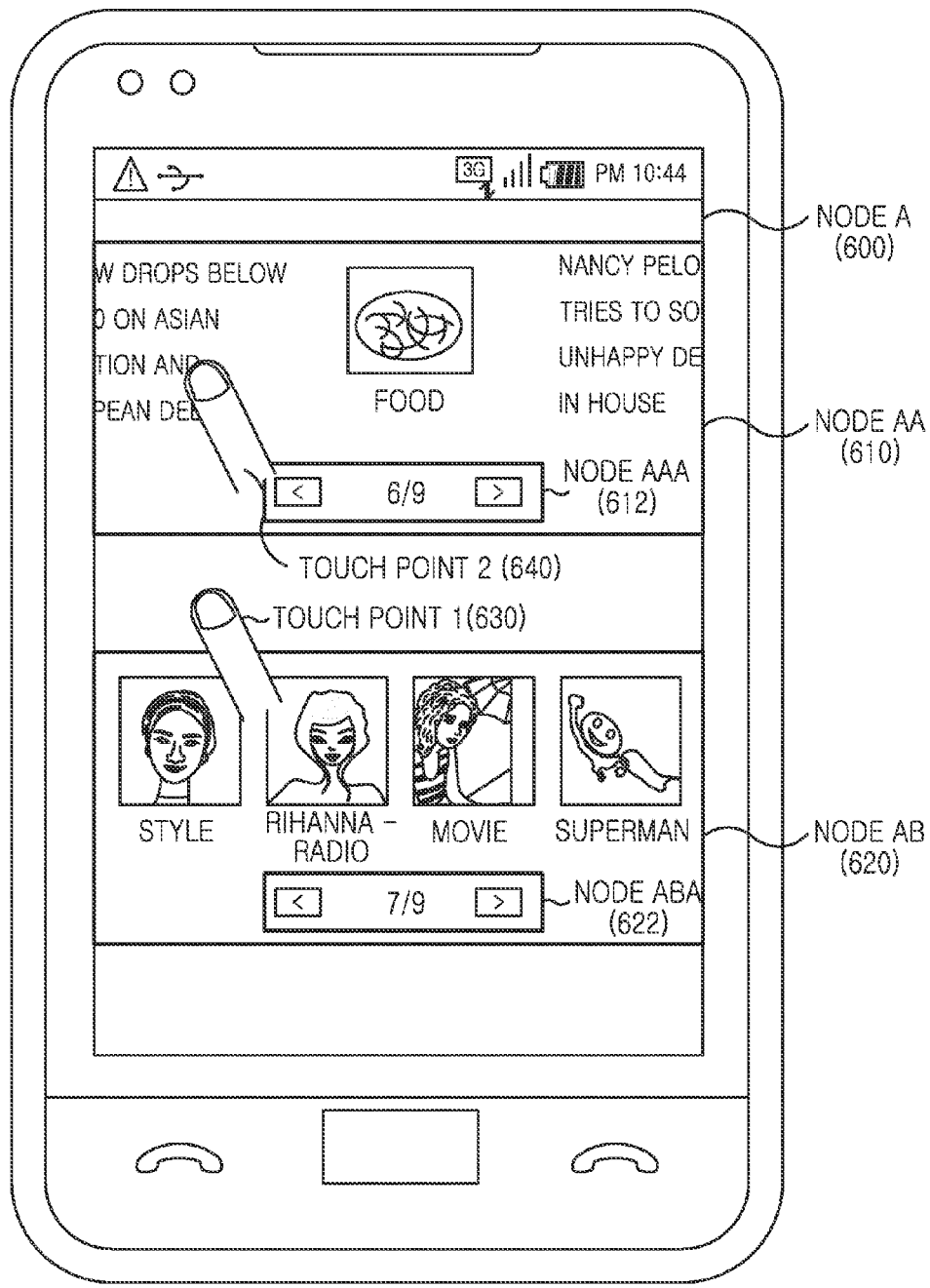
FIG. 6 is a diagram of a screen displaying touch information of an electronic document according to an exemplary embodiment of the present invention.

FIG. 5 is a flowchart of a method for sending the touch information by considering touch detection region information of an electronic document according to an exemplary embodiment of the present invention. FIG. 6 is a diagram of a screen displaying touch information of an electronic document according to an exemplary embodiment of the present invention.

Referring to FIGS. 5 and 6, the electronic device determines whether the touch input part of the touch screen detects the touch input in step 501. As illustrated in FIG. 6, the touch screen may display a document comprising node A 600, node AA 610, node AAA 612, node AB 620, and node ABA 622.

When detecting the touch input, the electronic device locates the touch point in step 503. For example, the electronic device can locate a first touch point 630 or a second touch point 640 as shown in FIG. 6.

In step 505, the electronic device determines whether the touch point resides in the touch detection region. For example, the electronic device can determine whether coordinates of the touch point are in the touch detection region. In so doing, the electronic device can easily determine whether the touch detection region covers the touch point using the touch detection region information of the tree structure.

When electronic device determines that the touch detection region covers the touch point in step 505, the electronic device proceeds to step 507 in which the electronic device sends the touch information to the electronic document processor in order to determine whether the electronic document itself can process the touch information detected in step 501. For example, when detecting the touch at the second touch point 640 in the touch detection region as shown in FIG. 6, the electronic device can send the touch information to the electronic document processor in order to determine whether the electronic document itself can process the touch information of the second touch point 640. When the electronic document can process the touch information, the electronic device performs the touch event only in a partial content region of the electronic document according to a next input touch information. More specifically, when detecting the drag from the second touch point 640, the electronic device changes the content in the node AA 610 toward the drag.

In contrast, when the electronic device determines that the touch detection region does not cover the touch point in step 505, the electronic device proceeds to step 509 in which the electronic device sends the corresponding touch information to the display control processor in order to perform the touch event corresponding to the touch information detected in step 501. For example, when detecting the touch at the first touch point 630 outside the touch detection region as shown in FIG. 6, the electronic device can send the corresponding touch information to the display control processor in order to perform the touch event corresponding to the touch information of the first touch point 630. When the electronic document cannot process the touch information, the electronic device can perform the touch event in the electronic document application program according to the next input touch information. More specifically, when detecting the drag from the first touch point 630, the electronic device can change the electronic document displayed in the display 162 toward the drag.

According to exemplary embodiments of the present invention, when the touch point resides in the touch detection region, the touch processor of the electronic device can send the touch information to the electronic document processor.

Alternatively, when the touch point resides in the touch detection region, the touch processor of the electronic device can send the touch information to the electronic document processor and the display control processor as shown in FIG. 7 or FIG. 8.

FIG. 7 is a flowchart of operations of a touch processor according to an exemplary embodiment of the present invention.

Referring to FIG. 7, the electronic device determines whether the touch input is detected through the touch input part of the touch screen in step 701.

When detecting the touch input, the electronic device determines whether a response for the previous touch input is received from the electronic document processor in step 703.

Figure 9:
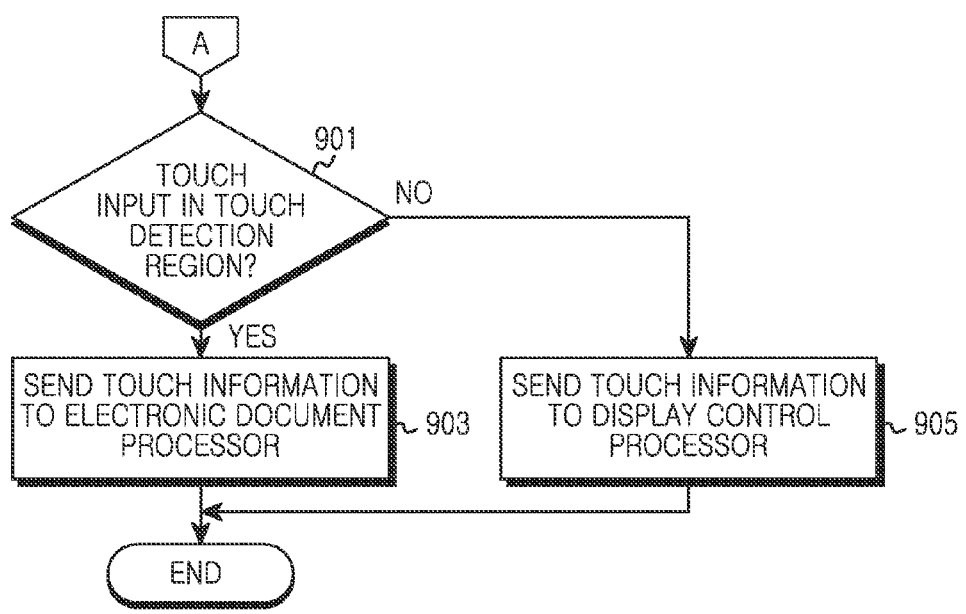
FIG. 9 is a flowchart of operations of a touch processor according to a response of an electronic document processor according to an exemplary embodiment of the present invention.

When the electronic device determines that the response for the previous touch input is received from the electronic document processor in step 703, the electronic device sends the touch information to the electronic document processor or the display control processor as shown in FIG. 9.

In contrast, when the electronic device determines that the response for the previous touch input is not received from the electronic document processor in step 703, the electronic device proceeds to step 705 in which the electronic device determines whether the touch information detected in step 701 corresponds to a touch_down (touch to a point).

When the electronic device determines that the touch information detected in step 701 corresponds to the touch_down in step 705, the electronic device proceeds to step 707 in which the electronic device locates the touch point. For example, the electronic device can locate the first touch point 630 or the second touch point 640 as shown in FIG. 6. Thereafter, the electronic device proceeds to step 709.

In step 709, the electronic device determines whether the touch point resides in the touch detection region. For example, the electronic device can determine whether the coordinates of the touch point are in the touch detection region. In so doing, the electronic device can easily determine whether the touch detection region covers the touch point using the touch detection region information of the tree structure.

When the electronic device determines that the touch detection region covers the touch point in step 709, the electronic device proceeds to step 711 in which the electronic device sends the corresponding touch information to the electronic document processor in order to determine whether the electronic document itself can process the touch information detected in step 701. In so doing, the electronic device can also send the touch information detected in step 701 to the display control processor so as to reduce the processing delay required to determine whether the electronic document itself can process the touch information. For example, when detecting the touch at the second touch point 640 in the touch detection region as shown in FIG. 6, the electronic device can send the touch information of the second touch point 640 to the electronic document processor and the display control processor. In so doing, the electronic device can set a touch state variable (e.g., SendToDoc) which corresponds to a global variable indicative of touch information transmission state of the touch processor, to a standby state (Maybe).

In contrast, when the electronic device determines that the touch detection region does not cover the touch point in step 709, the electronic device proceeds to step 713 in which the electronic device sends the touch information to the display control processor in order to perform the touch event corresponding to the touch information detected in step 701. For example, when detecting the touch at the first touch point 630 outside the touch detection region as shown in FIG. 6, the electronic device can send the touch information to the display control processor to perform the touch event corresponding to the touch information of the first touch point 630. In so doing, the electronic device can set the touch state variable (e.g., SendToDoc) to a first state (NO).

In contrast, when the electronic device determines that the touch information detected in step 701 does not corresponds to the touch_down in step 705, the electronic device proceeds to step 715 in which the electronic device determines whether the touch information detected in step 701 corresponds to a touch_up (release of touch).

When the electronic device determines that the touch information detected in step 701 does not correspond to the touch_up in step 715, the electronic device proceeds to step 717 in which the electronic device recognizes that a touch_move or a multi-touch is detected. In this case, the electronic device determines whether the touch state variable (SendToDoc) is set to the first state (NO).

When the electronic device determines that the touch state variable is set to the first state in step 717, the electronic device recognizes that the touch event for the electronic document application program is conducted. Accordingly, the electronic device proceeds to step 713 in which the electronic device sends the corresponding touch information to the display control processor in order to perform the touch event corresponding to the touch information (the touch_move or the multi-touch) detected in step 701.

In contrast, when the electronic device determines that the touch state variable is not set to the first state in step 717, the electronic device proceeds to step 719 in which the electronic device determines whether the touch state variable (SendToDoc) is set to a second state (YES).

When the electronic device determines that the touch state variable is set to the second state in step 719, the electronic device recognizes that the touch event of the electronic document is conducted. Accordingly, the electronic device proceeds to step 721 in which the electronic device sends the touch information detected in step 701 to the electronic document processor in order to determine whether to perform the touch event of the corresponding electronic document.

When the touch state variable is neither the first state nor the second state (e.g., when the electronic device determines that the touch state variable is not set to the second state in step 719), the electronic device recognizes that the touch state variable is the standby state. Hence, the electronic device proceeds to step 711 in which the electronic device sends the corresponding touch information to the electronic document processor in order to determine whether the electronic document itself can process the touch information detected in step 701. In so doing, the electronic device can also send the touch information detected in step 701 to the display control processor so as to reduce the processing delay required to determine whether the electronic document itself can process the touch information.

In contrast, when the electronic device determines that the touch information detected in step 701 corresponds to the touch_up in step 715, the electronic device finishes this process.

FIG. 8 is a flowchart of operations of a touch processor according to an exemplary embodiment of the present invention.

Referring to FIG. 8, the electronic device determines whether the touch input is detected through the touch input part of the touch screen in step 801.

When the electronic device determines that the touch input is detected in step 801, the electronic device proceeds to step 803 in which the electronic device determines whether the response for the previous touch input is received from the electronic document processor.

When the electronic device determines that the response for the previous touch input is received from the electronic document processor in step 803, the electronic device sends the touch information to the electronic document processor or the display control processor as shown in FIG. 9.

In contrast, when the electronic device determines that the response for the previous touch input from the electronic document processor in step 803, the electronic device proceeds to step 805 in which the electronic device determines whether the touch information detected in step 801 corresponds to the touch_down (touch to a point).

When the electronic device determines that the touch information detected in step 801 corresponds to the touch_down in step 805, the electronic device proceeds to step 807 in which the electronic device locates the touch point. For example, the electronic device can locate the first touch point 630 or the second touch point 640 as shown in FIG. 6. Thereafter, the electronic device proceeds to step 809.

In step 809, the electronic device determines whether the touch point resides in the touch detection region. For example, the electronic device can determine whether the coordinates of the touch point are in the touch detection region. In so doing, the electronic device can easily determine whether the touch detection region covers the touch point using the touch detection region information of the tree structure.

When the electronic device determines that the touch detection region covers the touch point in step 809, the electronic device proceeds to step 811 in which the electronic device sends the corresponding touch information to the electronic document processor in order to determine whether the electronic document itself can process the touch information detected in step 801. In so doing, the electronic device can also send the touch information detected in step 801 to the display control processor so as to reduce the processing delay required to determine whether the electronic document itself can process the touch information. For example, when detecting the touch at the second touch point 640 in the touch detection region as shown in FIG. 6, the electronic device can send the touch information of the second touch point 640 to the electronic document processor and the display control processor. In so doing, the electronic device can set the touch state variable (e.g., SendToDoc) which is the global variable indicative of the touch information transmission state of the touch processor, to the standby state (Maybe).

In contrast, when the electronic device determines that the touch detection region does not cover the touch point in step 809, the electronic device proceeds to step 813 in which the electronic device sends the touch information to the display control processor in order to perform the touch event corresponding to the touch information detected in step 801. For example, when detecting the touch at the first touch point 630 outside the touch detection region as shown in FIG. 6, the electronic device can send the touch information to the display control processor to perform the touch event corresponding to the touch information of the first touch point 630. In so doing, the electronic device can set the touch state variable (e.g., SendToDoc) to the first state (NO).

In contrast, when the electronic device determines that the touch information detected in step 801 does not correspond to the touch_down in step 805, the electronic device proceeds to step 815 in which the electronic device determines whether the touch information detected in step 801 corresponds to the touch_up (release of touch).

When the electronic device determines that the touch information detected in step 801 does not correspond to the touch_up in step 815, the electronic device recognizes that the touch_move or the multi-touch is detected. In this case, the electronic device determines whether the touch state variable (SendToDoc) is set to the first state (NO) in step 817.

When the electronic device determines that the touch state variable is set to the first state in step 817, the electronic device recognizes that the touch event for the electronic document application program is conducted. Accordingly, the electronic device proceeds to step 813 in which the electronic device sends the corresponding touch information to the display control processor in order to perform the touch event corresponding to the touch information (the touch_move or the multi-touch) detected in step 801.

In contrast, when the electronic device determines that the touch state variable is not set to the first state, the electronic device proceeds to step 819 in which the electronic device determines whether the touch state variable (SendToDoc) is set to the second state (YES).

When the electronic device determines that the touch state variable is set to the second state in step 819, the electronic device recognizes that the touch event of the electronic document is conducted. Accordingly, the electronic device proceeds to step 823 in which the electronic device sends the touch information detected in step 801 to the electronic document processor in order to determine whether to perform the touch event of the corresponding electronic document.

When the touch state variable is neither the first state nor the second state (e.g., when the electronic device determines that the touch state variable is not set to the second state in step 819), the electronic device recognizes that the touch state variable is the standby state. Hence, the electronic device proceeds to step 821 in which the electronic device stores the touch information detected in step 801 in a queue in order to confirm the response of the previous touch from the electronic document processor. In so doing, the electronic device can also send the touch information detected in step 801 to the display control processor so as to reduce the processing delay required to determine whether the electronic document itself can process the touch information.

In contrast, when the electronic device determines that the touch information detected in step 801 corresponds to the touch_up in step 815, the electronic device finishes this process.

FIG. 9 is a flowchart of operations of a touch processor according to a response of an electronic document processor according to an exemplary embodiment of the present invention.

Referring to FIG. 9, when the touch processor of the electronic device receives the response of the previous touch input from the electronic document processor in step 703 of FIG. 7 or in step 803 of FIG. 8, the electronic device determines whether the electronic document can process the touch information detected in step 701 of FIG. 7 or in step 801 of FIG. 8, in step 901. For example, based on the response of the electronic document processor, the electronic device determines whether to perform the touch event of the electronic document corresponding to the touch information detected in step 701 of FIG. 7 or in step 801 of FIG. 8. The electronic device may determine whether the touch input occurs in a touch detection region.

To perform the touch event of the electronic document corresponding to the touch information, the electronic device sends the touch information to the electronic document processor to conduct the touch event of the electronic document in step 903.

When not performing the touch event of the electronic document corresponding to the touch information, the electronic device sends the touch information to the display control processor to conduct the touch event of the electronic document application program in step 905.

Next, the electronic device finishes this process. The electronic device may determine whether the touch is detected in step 701 of FIG. 7 or in step 801 of FIG. 8.

As set forth above, the electronic device using the structured electronic document determines only whether the touch event takes places in the touch detection region of the electronic document, and performs the operation corresponding to the touch information in the electronic document application program while checking the touch event. Therefore, the touch response can be improved.

It will be appreciated that exemplary embodiments of the present invention according to the claims and description in the specification can be realized in the form of hardware, software or a combination of hardware and software.

Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for processing touch information in an electronic device, the method comprising:
   determining one or more regions for performing a touch event corresponding to touch information in an electronic document displayed on a touch screen; and
   when detecting a first touch, determining whether to process an event of the first touch in the electronic document or an application program of the electronic document based on a first touch point and the one or more regions,
   wherein the determining of whether to process the event of the first touch in the electronic document or the application program of the electronic document comprises transmitting the event of the first touch to a first processor and a second processor when the touch event corresponds to a touch down event and the first touch point is within the one or more regions,
   wherein the first processor processes the event of the first touch in the electronic document, and
   wherein the second processor processes the event of the first touch in the application program of the electronic document.

2. The method of claim 1, wherein the determining of the one or more regions comprises:
   when loading the electronic document to be displayed on the touch screen, determining one or more regions for performing an event corresponding to the touch information in the loaded electronic document.

3. The method of claim 2, further comprising:
   generating information of the one or more regions in a tree structure; and
   storing the information of the one or more regions having the tree structure.

4. The method of claim 1, wherein the determining of whether to process the event in the electronic document comprises:
   when detecting the first touch, comparing coordinates of the first touch point and the one or more regions; and when the coordinates of the first touch point reside in the one or more regions, determining to process the event of the first touch in the electronic document.

5. The method of claim 1, further comprising:
when not processing the event of the first touch in the electronic document, performing the event of the first touch in the application program of the electronic document.

6. The method of claim 1, further comprising:
when processing the event of the first touch in the electronic document, determining whether the electronic document is capable of processing the event of the first touch.

7. The method of claim 6, further comprising:
performing the event of the first touch in the application program of the electronic document while determining whether the electronic document is capable of processing the event of the first touch.

8. The method of claim 6, further comprising:
when detecting a second touch while determining whether the electronic document is capable of processing the event of the first touch, performing an event of the second touch in the application program of the electronic document.

9. The method of claim 6, further comprising:
when the electronic document processes the event of the first touch, performing the event of the first touch in any one of the one or more regions.

10. The method of claim 9, further comprising:
when the electronic document processes the event of the first touch, detecting a second touch; and
when detecting the second touch, performing an event of the second touch in any one of the one or more regions.

11. An electronic device comprising:
a touch screen; and
a first processor configured to:
determine one or more regions for performing a touch event corresponding to touch information in an electronic document displayed on the touch screen, and
determine, when detecting a first touch on the touch screen, whether to process an event of the first touch in the electronic document or in an application program of the electronic document based on a first touch point and the one or more regions;

a second processor configured to process the event of the first touch in the electronic document; and
a third processor configured to process the event of the first touch in the electronic document application program,
wherein the first processor is further configured to transmit the event of the first touch to the second processor and the third processor when the touch event corresponds to a touch down event and the first touch point is within the one or more regions.

12. The electronic device of claim 11, wherein the second processor is further configured to:
extract, when loading the electronic document to be displayed on the touch screen, one or more regions for performing an event corresponding to the touch information in the loaded electronic document, and
determine whether the electronic document is capable of processing the event of touch information.

13. The electronic device of claim 12, further comprising:
a storage configured to store information of the one or more regions extracted by the second processor,
wherein the information of the one or more regions has a tree structure.

14. The electronic device of claim 11, wherein the second processor is further configured to perform, when the electronic document processes the event of the first touch, the event of the first touch in any one of the one or more regions.

15. The electronic device of claim 14, wherein the first processor is further configured to send, when the electronic document processes the event of the first touch, second touch information additionally detected, to the second processor.

16. The electronic device of claim 11, wherein the first processor is further configured to:
compare coordinates of the first touch point and the one or more regions, and
determine, when the coordinates of the first touch point reside in the one or more regions, to process the event of the first touch in the electronic document.

17. The electronic device of claim 11,
wherein the first processor is further configured to send, when the event of the first touch is not processed in the electronic document, the first touch information to the third processor.

* * * * *